Aug. 19, 1924.
T. FREEDLANDER
AUTOMOBILE SEAT
Filed Feb. 28, 1923
1,505,550
4 Sheets-Sheet 1
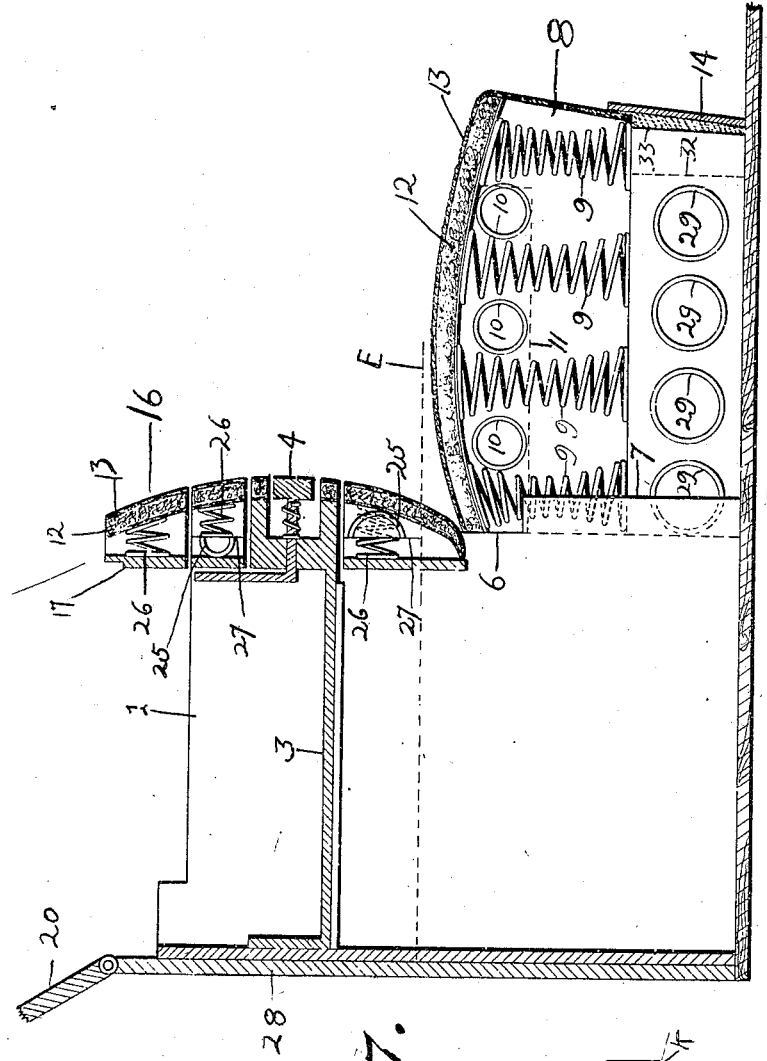
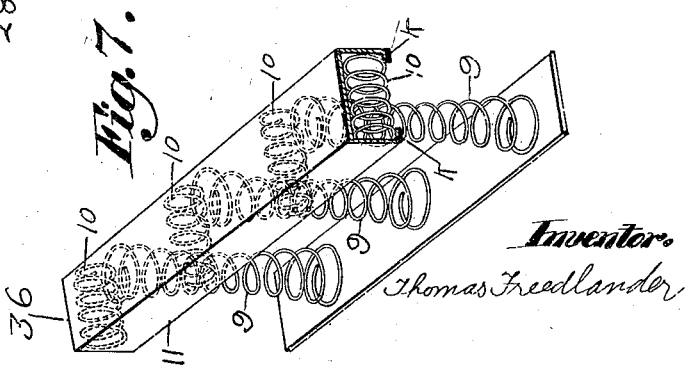
Inventor.
Thomas Freedlander

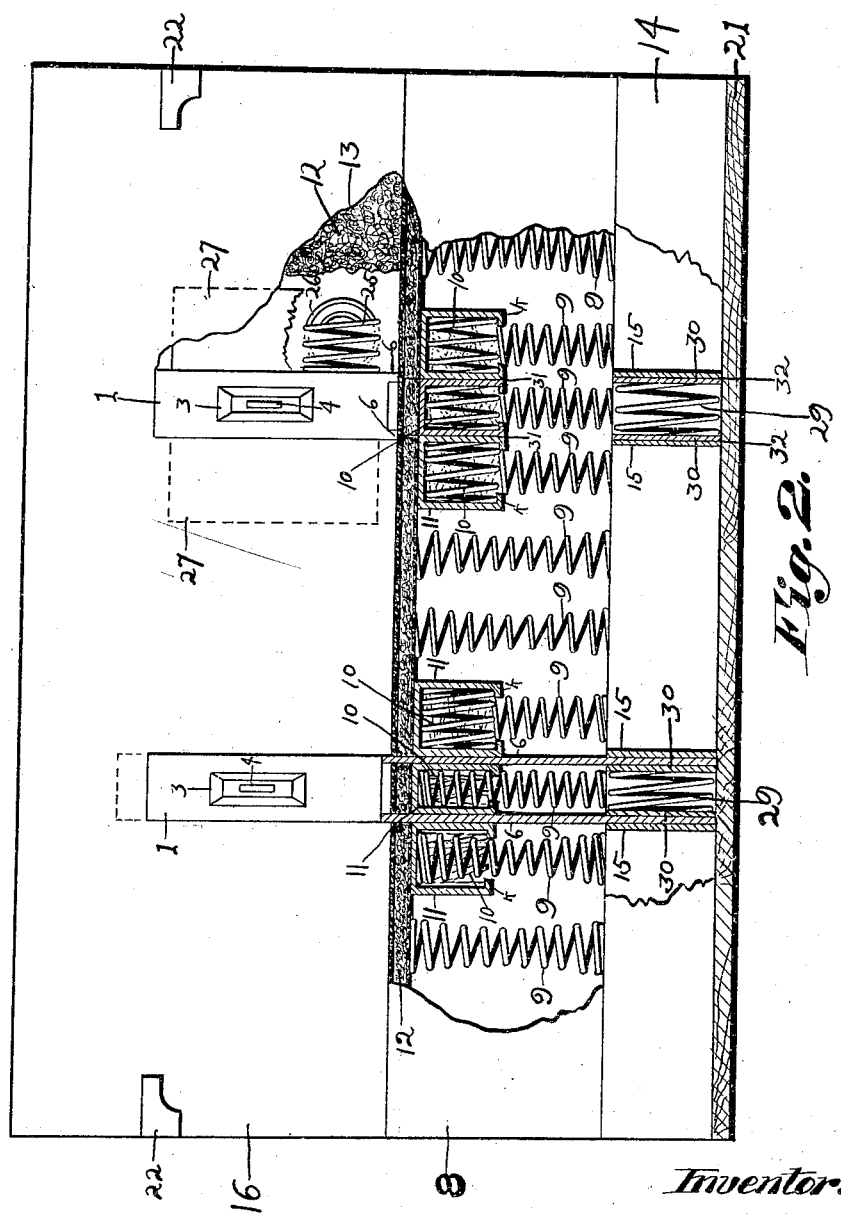

Aug. 19, 1924.
T. FREEDLANDER
AUTOMOBILE SEAT
Filed Feb. 28, 1923    4 Sheets-Sheet 3
1,505,550
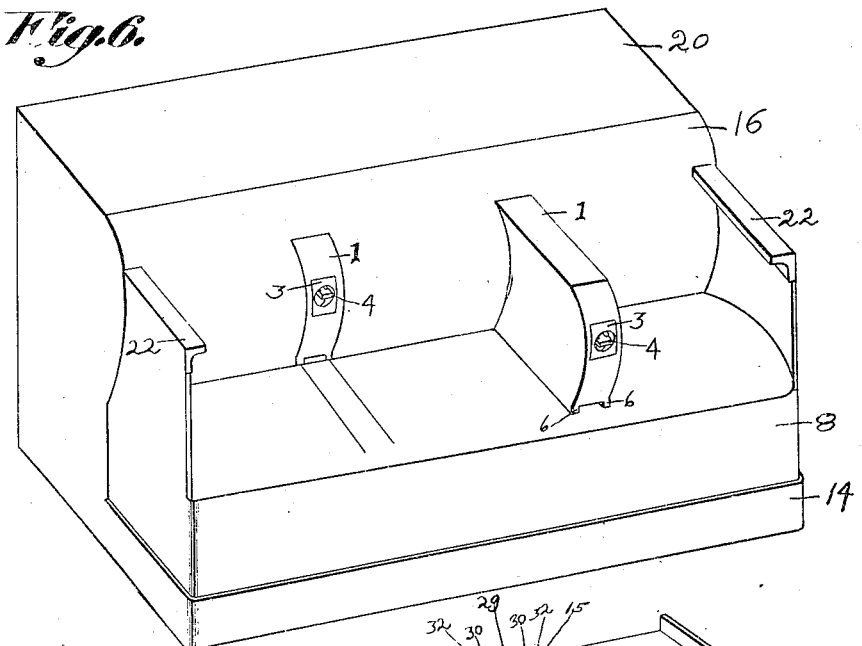
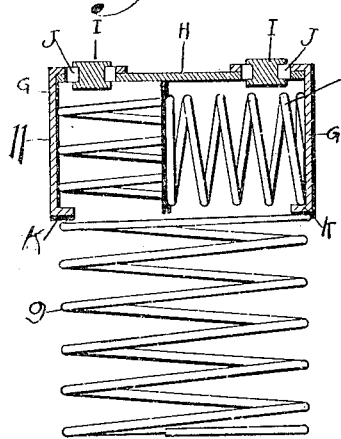
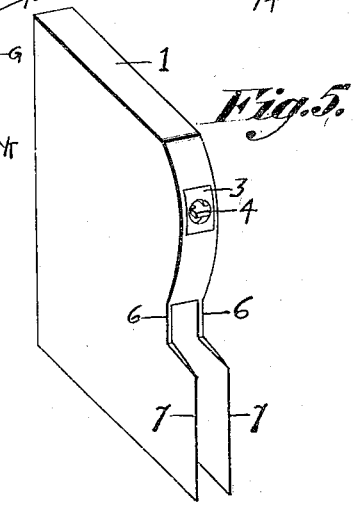
Inventor.
Thomas Freedlander

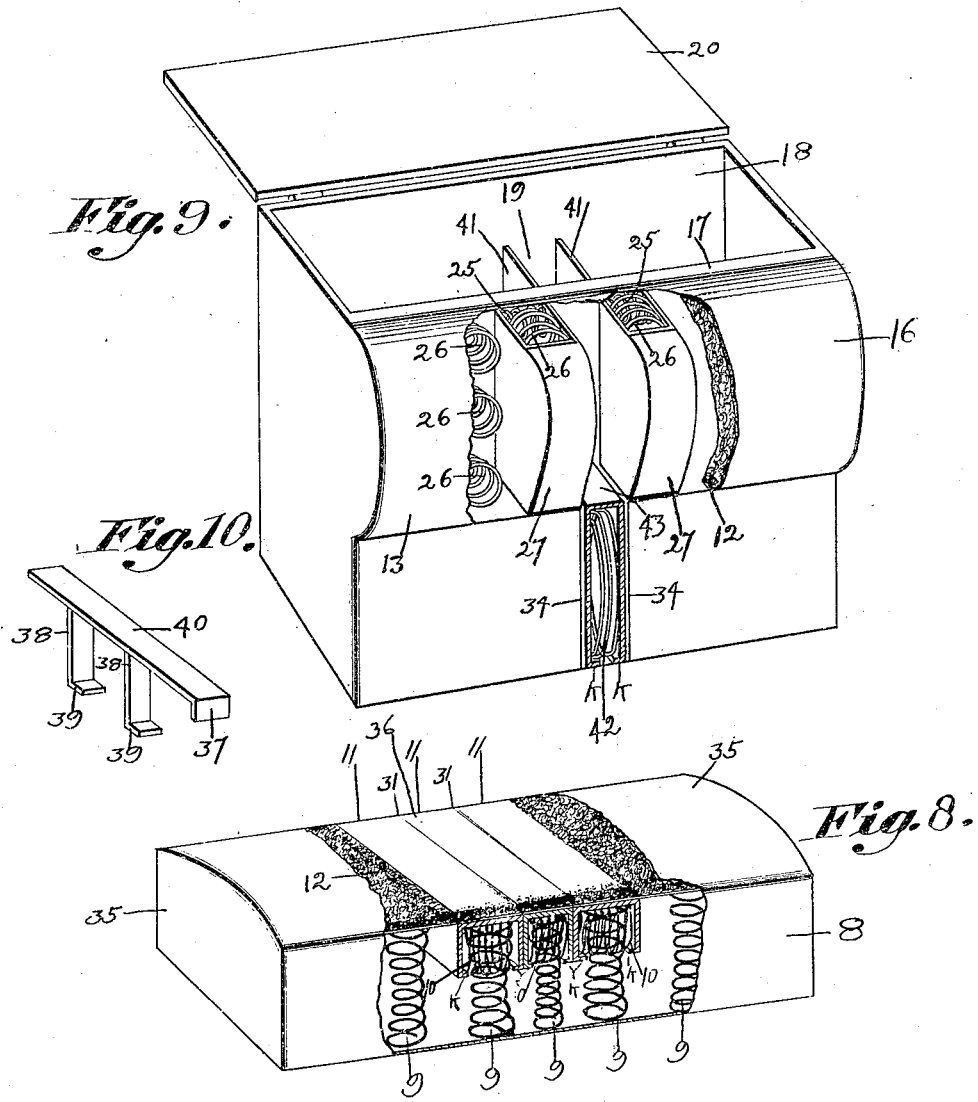

Patented Aug. 19, 1924.

1,505,550

UNITED STATES PATENT OFFICE.

THOMAS FREEDLANDER, OF BALTIMORE, MARYLAND.

AUTOMOBILE SEAT.

Application filed February 28, 1923. Serial No. 621,724.

*To all whom it may concern:*

Be it known that I, THOMAS FREEDLANDER, a citizen of the United States, residing at city of Baltimore and State of Maryland, have invented a new and useful Automobile Seat, of which the following is the specification.

My invention relates to improvements in automobile seats, an improvement over my basic Patent Number 1,405,108. The guides in my improved device because of their design and construction are practically invisible when the arm-rest is in inoperative position and support the arm-rest at its standards firm when said arm-rest is in operative position. This invention comprises a seat cushion novelly designed and constructed with perpendicular and horizontal springs, together with metal housings, a seat cushion base having guides and supports, and downward extensions of the sliding arm-rest standards fitted with forerunners and a back rest of improved construction having cross springs with metal housings.

The objects of my improvements are to,

First. Permit the seat cushion guides to close or contract when the arm-rest is not in use, thus eliminating the openings or gaps in said cushion as is evident in my Patent No. 1,405,108, thus giving the seat cushion an unbroken exterior surface, and appearance, permitting easier sitting comfort to the passenger.

Second. To give the arm-rest a better support when said arm-rest is in use or in operative position.

I obtain these objects by the mechanism illustrated in the accompanying drawings, in which—

Fig. 1 is a longitudinal cross sectional view of the seat.

Fig. 2 a transverse cross sectional view of seat showing arm-rests both in operative and inoperative position.

Fig. 3 a view of the seat cushion base showing guides and supports for receiving and supporting arm-rest standards.

Fig. 4 a detailed cross section view of the parts forming the seat cushion guides embracing perpendicular and horizontal springs and housings for same.

Fig. 5 a perspective view of the arm-rest showing improved standards.

Fig. 6 is a view of the seat as it looks with one arm-rest in operative position and the other in inoperative position.

Fig. 7 is a view in perspective of narrow cushion before the stuffings and upholstering is applied.

Fig. 8 is a perspective view of the seat cushion with part of covering or upholstering cut away.

Fig. 9 is a view of back rest with part of covering or upholstering cut away.

Similar numerals refer to similar parts throughout the several views.

The arm-rest 1, see Fig. 5, has long standards, 6, 6, having guides or forerunners 7, 7. The seat cushion 8, see Figures 1, 2, 4, and 8, has or is fitted with rows of perpendicular springs 9, three rows of which are placed closer together than the other rows; the centre row of said three rows of perpendicular springs may be less in width or diameter. A metal covering, casing or housing 11, 11, 11, being of metal construction is designed so that the two sides may be forced closer together or further apart due to the springs contained therein together with the movement of the standards to and from operative position and is shown in Fig. 4, the following of which is an explanation of the sectional character. A right and left metal flange facing each other, the top sides of which are larger than the bottom are supported on a metal strip to which they are attached by means of an I beam fastener fitting through slots on both sides of the top. This housing 11, is provided for said three rows of perpendicular springs 9, 9, 9, within which are placed horizontal springs 10, 10, 10, between the said perpendicular springs 9 to keep or permit both walls or sides $g$, $g$ of the centre housing 11, as closely as possible in contact with the inner sides of the two outer housings 11, 11. The walls or sides $g$, $g$, $g$, $g$, of the housings 11, 11, 11, form the guides and supports 31, 31, in cushion 8 for the arm-rest standards 6, 6, see Fig. 8.

Three cushions 35, 35, 36 are used to a single arm-rest 1, as shown in Fig. 8. Fig. 4 shows in detail the design, construction and functioning of the housing 11 which being used in pairs of threes forms the guides 31 in the seat cushion. The side walls G, G, of each spring housing 11 are kept apart as far as possible by means of horizontal springs 10, which are held in place by flanges K, K, as well as by the perpendicular springs on either side of said horizontal springs thus permitting both sides G, G, of the centre housing 11 to keep as close as possible to the inner sides of the two outer housings, 11, 11, at all times, see Fig. 2. The top, H, is held to the sides, G, G, by means of spool or eye-shaped fasteners, I, I. The spaces J, J, aid the walls G, G, in expanding or contracting the guides 31, 31, see Fig. 4. This expansion and contraction of the guides 31, 31, is controlled or governed by the horizontal springs 10 during movement of the standards 6, 6, of arm-rest 1, in and out of operative position.

The seat cushion stand or base 14, has guides composed of two walls, 30, 30, between which are placed horizontal springs 29 and a rigid stationary wall 15, 15, on either side of walls 30, 30. These walls 30, 30, are actuated by the springs 29. Attached to the inner front side of this seat base 14, see Figs. 1 and 3, or to the forward ends of walls or sides 15, 15 in Fig. 3, are rubber stops, 33, 33, for the arm-rest standard forerunners or guides 7, 7, to hit or strike against when said arm-rest standards 6, 6, are fully received by the seat cushion base guides 32, 32, thus preserving the front side of base 14, and forward edge of standard guides 7, 7, as well as eliminating noise that would be heard were these said rubber stops, 33, 33, not employed.

The back-rest 16, which is the front side of compartment 18, is of novel construction. The arm-rest housing 19 comprises two walls 41, 41, between the lower half of which is, or are, placed single or multiple horizontal springs 42, within a housing 43, designed similar to housing 11, in Fig. 4 except in size. The housing 43 and the lower half of the walls 41, 41, form the guides 34, 34, for the arm-rest standards 6, 6, to travel in. The springs or spring 42, actuating or forcing apart the walls or sides of said housing 43, imparts pressure to or against the standards 6, 6, see Fig. 5, thus giving said standards a firm support at all times. The rear part of arm-rest 1 is supported by the arm-rest housing 19, as well as the mechanism in the back rest when said arm-rest 1 is in use or in operative position, and this is accomplished by means (see Figs. 1, 2 and 9) of placing in the back rest on either side of arm-rest 1, a metal case, cover or housing 27, 27, over the row of springs 26, 26, on either side nearest the arm-rest. In these said housings 27, 27 are placed crossing horizontal springs 25, 25, between the horizontal springs 26. These mentioned back rest metal spring housings 27 are similar to the housings 11 shown in Fig. 4 in design, construction and function. Constant pressure is exerted upon the arm-rest standards 6, 6, by the sides G of the spring housing 27, 27 because of the springs 25, 26, contained therein.

The seat cushion base Fig. 3, is placed against the lower part of back rest, Fig. 9, and the seat cushion, Fig. 8 is placed upon seat cushion base Fig. 3 and against the back rest Fig. 9, thus permitting the guides 31, 31, in the cushion 8, formed by the mechanism 10, 10, 10, 11, 11, 11, shown in Fig. 4 and Fig. 8, (see Fig. 4 for the detailed mechanism,) to line up or match up with the guides 32, 32, in cushion base 14 formed by the mechanism 15, 15, 29, 29, 29, 29, 30, 30, shown in Fig. 3 and the arm-rest housing guides 34, 34, (see Fig. 9) thereby forming a complete track within which travels and is supported the arm-rest standards 6, 6. When the arm-rest 1 is desired for use it is drawn forward from its housing 19, by the handle 4, of a drawer 3, into the guides 31, 31, of the cushion and the guides 32, 32, of cushion base 14; thus bringing the arm-rest 1 to operative position as shown in Fig. 6. The guides 7, 7, of arm-rest standards 6, 6, are V-shaped, terminating in a more or less fine edge. Part of, or all of, these said starters or forerunners 7, 7, are in the seat cushion guides 31, 31, and the seat cushion base guides, 32, 32, at all times. As the standards 6, 6, are drawn into the guides 31, 31, and 32, 32, the said guides 31, 31 and 32, 32, open, spread apart or expand enough to permit said standards 6, 6, to enter, or allow said guides 31, 31, and 32, 32 to expand enough to receive and support arm-rest standards 6, 6, when pulled forward or drawn into them. The arm-rest base is thus supported in and by the guides 31, 31, and 32, 32, when in operative position, and the rear of the arm-rest when in operative position is supported by means of the mechanism in the back-rest, mentioned heretofore (see Figs. 2 and 9) pressing against both sides of the remaining part of arm-rest 1, in its housing 19. The standard guides 7, 7, hit against the rubber stops 33, 33, when the arm-rest is fully received by the cushion and cushion-base guides. Fig. 6 is a view of seat as it appears when assembled. The upholstery is done in the usual manner and since the upholstery is attached to the flexible parts of the seat the said upholstery acts with the flexibility of the working parts of the said seat. The seat is not necessarily limited to automobiles.

I am aware that arm-rests are in use today in automobiles, but this seat is altogether different and more applicable to comfort than other seats which are not like the one described in this specification.

Therefor I claim:

1. The combination in a vehicle seat having a cushion base and seat cushion of an arm rest for said seat adapted to be moved forwardly and rearwardly thereon into and out of operative position, said base and cushion having flexible housings therein, extensions on the lower portion of said arm rest fitting in slots in the seat cushion and between said flexible housings whereby said slots may expand and contract upon movement of the arm rest into and out of operative position.

2. In a vehicle seat having a back rest, a cushion base and a seat cushion, an arm rest adapted to be slid over said cushion and normally housed in said back rest, slots in said seat cushion and back rest, spring housings in said back rest, seat cushion and base adjacent said slots, said arm rest having base extensions adapted to fit into the slots and between the walls of said spring housings whereby when said arm rest is slid back and forth on the cushion, the slots will be automatically opened and closed.

THOMAS FREEDLANDER.